(12) United States Patent
Wasterlid (10) Patent No.: US 11,097,751 B2
(45) Date of Patent: Aug. 24, 2021

(54) DEVICE FOR TRANSPORT AND STORAGE OF PASSENGER CARS

(75) Inventor: Kurt Wasterlid, Hassleholm (SE)

(73) Assignee: KYRKBYNS INDUSTRI AB, Hassleholm (SE)

( * ) Notice: Subject to any disclaimer, the term of this patent is extended or adjusted under 35 U.S.C. 154(b) by 2452 days.

(21) Appl. No.: 14/350,853

(22) PCT Filed: Apr. 10, 2012

(86) PCT No.: PCT/SE2012/050382
§ 371 (c)(1),
(2), (4) Date: Apr. 10, 2014

(87) PCT Pub. No.: WO2012/138295
PCT Pub. Date: Oct. 11, 2012

(65) Prior Publication Data
US 2021/0031812 A1   Feb. 4, 2021

Related U.S. Application Data

(60) Provisional application No. 61/473,300, filed on Apr. 8, 2011.

(30) Foreign Application Priority Data

Apr. 8, 2011  (SE) .................................... 1150314-1

(51) Int. Cl.
*B61D 3/18* (2006.01)
*B61D 45/00* (2006.01)
*B61D 47/00* (2006.01)

(52) U.S. Cl.
CPC ........... *B61D 3/187* (2013.01); *B61D 45/001* (2013.01); *B61D 47/005* (2013.01)

(58) Field of Classification Search
CPC .... B61D 3/187; B61D 45/001; B61D 47/005; B61D 47/00; B61D 3/18; B61D 3/184;
(Continued)

(56) References Cited

U.S. PATENT DOCUMENTS 2,567,328 A * 9/1951 Fahland ................ B61D 47/00
410/43
3,182,610 A * 5/1965 Jones ...................... B61D 3/18
410/5
(Continued)

FOREIGN PATENT DOCUMENTS

EP  1676792 A1  7/2006
GB  2050304 A   1/1981
WO  2006038783 A1  4/2006

*Primary Examiner* — Zachary L Kuhfuss
*Assistant Examiner* — Cheng Lin
(74) *Attorney, Agent, or Firm* — Volpe Koenig (57) ABSTRACT

A device and method for efficient transport of passenger cars or similar, with a high environmental and energy saving result, including, for example, a two-dimensional framework, a connecting element positioned and attached in a third dimension perpendicular to the framework. The two-dimensional framework and the connecting element together form a framework body of the device. A fastening device for vertical attachment and storage of a passenger car is provided. The passenger cars are placed vertically suspended in the container device such that the use of volume is significantly improved compared to prior solutions.

17 Claims, 7 Drawing Sheets

(58) Field of Classification Search
CPC ........ B61D 45/004; B61D 47/19; B61D 3/02; B61D 17/10; B61D 19/002; B61D 19/004; B61D 3/16; B61D 3/166; B61D 19/00; B60P 3/071; B60P 3/07; B60P 3/075; B60P 3/077; B60P 3/079; B60P 3/06; B60P 3/08; B65D 2585/6867
USPC .. 105/158.1, 158.2, 159, 72.2, 215.1, 215.2, 105/216, 217, 414
See application file for complete search history.

(56) References Cited

U.S. PATENT DOCUMENTS

| | | | | |
|---|---|---|---|---|
| 3,499,694 A | * | 3/1970 | Georges | B65D 90/14 312/35 |
| 3,661,098 A | * | 5/1972 | Jaekle | B61D 47/005 410/6 |
| 3,752,085 A | * | 8/1973 | Venditty | B61D 3/18 410/6 |
| 3,788,238 A | * | 1/1974 | Bennett | B61D 3/18 410/6 |
| 3,799,068 A | | 3/1974 | Pringle | |
| 3,802,354 A | * | 4/1974 | Bateson | B60P 3/073 410/5 |
| 3,844,424 A | * | 10/1974 | Ross, Jr. | B61D 47/005 414/391 |
| 3,896,741 A | * | 7/1975 | Chapman | B61D 47/005 410/6 |
| 4,759,668 A | | 7/1988 | Larsen et al. | |
| 4,766,818 A | | 8/1988 | Wicks et al. | |
| 4,938,643 A | * | 7/1990 | Lamb | B61D 3/182 104/44 |
| 5,220,870 A | * | 6/1993 | Larson | B60F 1/046 105/159 |
| 5,899,646 A | * | 5/1999 | Tatina | B61D 45/001 410/100 |
| 6,205,932 B1 | * | 3/2001 | Khattab | B61D 3/18 105/355 |
| 6,612,793 B2 | * | 9/2003 | Coslovi | B61D 3/16 242/395.1 |
| 7,637,217 B2 | * | 12/2009 | Barry | B61D 47/00 105/355 |
| 8,371,236 B2 | * | 2/2013 | Budnick | B61D 3/18 105/404 |
| 2008/0141897 A1 | * | 6/2008 | Zaerr | B61D 3/187 105/404 |

* cited by examiner

DEVICE FOR TRANSPORT AND STORAGE OF PASSENGER CARS

TECHNICAL AREA

The present invention is derived to a device for efficient transport of passenger cars, with a high environmental and energy saving result. More specifically, the invention derives to a device according to the introductory part of claim 1 and a method for transport of passenger cars, with such a device.

TECHNICAL BACKGROUND

Transport of passenger cars is a significant part in the production and sales process of passenger cars. A factory that produces passenger cars normally sells these to countries all over the world. This means that the passenger cars have to be transported from the factory where they are produced to the local car dealer who sells the passenger car to the end consumer.

So far this has been done by driving the produced passenger cars, rolling out from the car factory production lines, to a temporary parking. This requires a large amount of people. During the transport to the car park there are also significant risks of damages to the passenger cars.

The passenger cars are standing on the parking lot until a boat, a train or a truck collects them. Passenger cars that are to be transported by boat, are transported from the temporary car park by truck or train or are driven to the Ro-Ro port (Roll-on Roll-off) with a large amount of people unloading and parking them (with significant risks of damages to the passenger cars).

After that, thousands of passenger cars are standing in the dock area at high expense, waiting for the Ro-Ro ship to be loaded. When the ship arrives a large amount of people is required to drive the passenger cars onto the ship and secure the passenger car tires to the boat deck. The passenger cars are standing close to each other and there are risks of damages to the passenger cars before they are secured.

When the ships reach their destination port, a large amount of people is required to loosen the clamps securing the car tires, drive the passenger cars and park them for storage in the dock area at high expense. The passenger cars are stored in the dock area before they can be driven away or loaded onto trains or trucks for further transport. Also in this handling there are significant risks of damages to the passenger cars.

Boat transport is the most common way to transport passenger cars to near or distant destinations. Passenger cars produced in Sweden, for example, are sold mostly in North America and Asia.

These boat transports are normally done with custom built huge so called Ro-Ro ships. In these the passenger cars are driven into the car deck where they are secured until the ship has reached its destination. However there is a major disadvantage that the transport of passenger cars is limited to these Ro-Ro ships when there is a great freight infrastructure available with other types of cargo ships.

Rail transports are done by regular train cars in which the passenger cars are secured to the flatbed, or by using custom built train cars where the passenger cars are driven into the train car in one or two levels and positioned one after another in the direction of travel of the train car.

This type of transport is not very efficient when there is substantial unused space around the passenger cars.

Truck transports are often done by custom built passenger car carrier trucks where the passenger cars are driven onto the ramps in two levels.

On trucks, and to some extent at ships, containers are also used for passenger car transport. There are a number of different types of containers intended for this purpose.

A common variant is a standard ISO container, where one passenger car is driven into the container and is lifted at the rear end so that a second passenger car can be driven in with the hood underneath the first passenger car.

Such containers are shown for example in patent publications GB 2 050 304 and EP 1 676 792. The advantage of this type of container is that it is a standard freight container that is easy to handle in ports as well as on trains or on trucks.

U.S. Pat. No. 4,759,668 shows a type of container where the passenger cars also can be placed in two levels in the container. The problem with use of these types of containers is that it causes a lot of unused space in the containers, which makes the transport relatively inefficient. Inefficient transport involves high costs and unnecessary impact on the environment.

Another type of container is shown in WO 2006/038783 where the passenger cars are hung in special devices so that two layers of passenger cars are created. Also use of this type of container causes a lot of unused space. This type of container is further too high to be placed on a railway car. The container together with the railway car has a total height that exceeds the maximum height for bridges and tunnels according to the railway standard.

The presentation above of known techniques for transport of passenger cars shows that there are problems with storage and transport of passenger cars by ship, truck and train.

It is desirable to find techniques that limit the need for huge car parks, which makes transport on boats and trains, and to some extent on trucks, more efficient. Because of environmental concerns, it is also of great interest of transferring land transports from trucks to trains.

SUMMARY OF THE INVENTION

Purposes of the present invention is to move the position of the techniques of passenger car transport forward, to solve the problems mentioned above and to provide a device or container for efficient transport of passenger cars.

This purpose together with other purposes are achieved by a device for storage and transport of passenger cars or equivalent including the following: at least one two-dimensional framework, at least one connecting element positioned and attached in the third dimension perpendicular to said at least one two-dimensional framework.

Said at least one two-dimensional framework and the said at least one connecting element together form a framework body of the said device.

This device is further characterized by including at least one fastening device for vertical attachment of passenger cars in order to arrange the passenger cars vertically.

When the passenger cars are placed vertically suspended in the container device according to this invention; the use of volume is significantly improved compared to previous container solutions and known techniques for transport of passenger cars.

This leads to significant savings of the environment and energy. Storage in a container device according to this invention also allows the huge parking lots that are currently required for storage of passenger cars can be reduced dramatically at the same time as the passenger cars are protected from damage due to wind and weather. The use of this container device also makes transport by truck; train and boat much easier at the same time as the risk of damages to the passenger cars during re-loading are avoided.

Custom built ships can be avoided, which increases the transport possibilities radically because container shipping is a much bigger industry than Ro-Ro shipping.

The logistics of transporting passenger cars is made easier when all passenger cars can be loaded into the same type of transportation device regardless of the mode of transport for the transportation device from its departure point to the final destination. The risk of damages to the passenger cars is reduced dramatically when transport from car parks to containers, trucks or ships are no longer needed. The passenger cars are loaded and unloaded only once on their transport from the factory to their final destination or equivalent.

The said at least one two-dimensional framework is preferably a flat two-dimensional structure like a door jamb or similar and the said at least one connecting element is preferably one or more beams. These together with one or more frameworks form the volume that defines the volume of the device.

Further, the said at least one two-dimensional framework is preferably located vertically in the cross-direction of the device, and the said at least one connecting element is preferably located in the longitudinal direction. The length of the device in longitudinal direction is preferably larger than the width of the device in said cross-direction.

The cross-sectional shape of the said at least one two-dimensional framework of the cross direction of the device is preferably further limited to the established maximum cross-sectional dimensions of the railway standard, i.e. the cross-sectional shape is adapted to the maximum loading gauge for railway for each country. The shape of said at least one two-dimensional framework preferably has an upper section that is substantially arched following the railway standard. Such a limitation makes it possible to use the container also on railways where there are bridges and tunnels. This provides additional options that can reduce transport costs and also yield significant environmental benefits.

The vertical placement of the passenger cars means that the maximum height of the railway standard is used to a very high degree. When cross-sectional dimensions approach the maximum of the railway standard, as large passenger cars as possible can be transported in an upright position, which optimizes the number of passenger cars that can be loaded by volume in a container.

The framework body of the device preferably comprises a vertical center structure along the center line of the device. The said at least one fastening device is preferably located towards the vertical center structure. A passenger car is located in vertical direction with its bottom plate towards the said vertical center structure, and at least one additional fastening device, preferably attached on the opposite side of the said vertical center structure. Such a positioning is suitable in order to optimize the space inside the container.

Two passenger cars can be placed vertically with their bottom plates towards each other on both sides of the vertical center structure. Passenger cars are placed with their rear end downwards so that the hoods on the two passenger cars are positioned upwards so that the arching of the framework body does not cause problems. Therefore; it does not matter if the passenger car is a station wagon or a sedan. When the volume use of the device is increased it is possible to carry more passenger cars per container length than before, which consequently leads to more efficient transport of passenger cars.

If the passenger car is short enough so that it is not necessary for the hood to be placed upwards due to space, or if the passenger car in question is a sedan model, the passenger car can also be placed with the hood downwards. If the passenger car is short enough, it is also possible to place two passenger cars according to what is said above with the wheels outwards against the container outer wall instead of towards the inner wall. If the passenger cars to be transported are short, like e.g. two-seated electric passenger cars, they can, if it is space available, be placed vertically on top of each other.

According to one variant of the present invention the said fastening device comprises a removable ramp plate adapted to drive up the vehicle with four wheels on. The said ramp plate comprises fastening devices intended to secure the plate to the passenger car, and fastening devices intended to secure the ramp plate vertically in the said device.

A removable ramp plate has the advantage that the passenger car can be rolled up on the plate horizontally and secured to the plate when both the ramp plate and the passenger car are in horizontal position, for example on the ground. Thereafter, the plate can be lifted into place in the device with a crane or similar lifting equipment and fastened into vertical position. When the passenger car will be unloaded this can be done by means of a crane again. If there a crane is not available, which might be the case when small deliveries are made to small customers, the ramp plate can be used to unload the passenger cars.

According to one variant of the invention; the said at least one vertical center structure is pivotal around its horizontal center line. The ramp plate is further preferably possible to slide along the said pivotal vertical center structure. Since the description above describes a passenger car hanging on each side of the vertical center structure; the rotation of the passenger car that is pivoted downwards will be limited. When the ramp plate is pivoted as much as desired, maximum according to the described limitation above, the ramp plate or an extension of the ramp plate in the form of wheel ramps is pulled out. After that the passenger car is loosened from the ramp plate so that it can roll down along the wheel ramps to the ground next to the container. This procedure can of course be reversed in order to load a passenger car even if there is no lifting equipment available. In this case; preferably a winch or similar is used to crank up the passenger car to the ramp plate and thereafter place the ramp plate in a vertical position.

According to another variant of the invention; the said at least one ramp plate is pivotal around a joint or hinge in the upper edge of the ramp plate, seen in a vertical hanging position. The said at least one hinge can be lowered so that the opposite end of the plate is in contact with the ground. This variant, with respect to the ramp plate, does not require a rotating vertical center structure to load a passenger car which is fastened to the ramp plate. The ramp plate is loosened at the lower edge and is folded out from the vertical center structure. At the same time as the ramp plate is pivoted out from the vertical center structure, it is lowered down in the vertical direction along the vertical center structure. The passenger car is released from the ramp plate and rolled down to the ground. This design can also be done without said hinges to be lowered. This requires, however, that the plate is extendable along the wheel ramps, like the rotating design, so that the passenger car can be rolled all the way down to ground level. Like the rotating design, this design can also this be used to unload a passenger car, instead of using lifting equipment.

If the passenger car is placed with the wheels towards the outer wall, preferably the outer wall comprises the said at least one ramp plate according to a third variant of the present invention. The ramp plate is then preferably pivotal around its lower fastening device so that it can be pivoted down like a ramp and the passenger car can be rolled off directly from the ramp plate.

The device according to the present invention further preferably comprises bottom support intended to carry the device and its contents. These bottom supports can preferably be extendable vertically from the said framework body, comprises a locking device and are adjustable in their vertical direction. The use of bottom supports is an advantage if/when a forklift is used to move the device. If train or truck bogies are to be connected to the device, the device must also be positioned at the proper height, which can be done by means of the supports. The supports are equipped with notches adapted for the container fittings, so that they can be attached and locked to each other both when they are stacked upon each other and secured in a boat deck during a boat transport etc. The device has further preferably also a corresponding support upwards, adapted to carry another container or weight. The supports upward and downward are preferably adapted to fit into each other if several containers are stacked upon each other. Stackable containers provide additional benefits since they need even less ground surface. The height of the upper supports can preferably also be adjusted and folded into the framework body, so they do not affect the arched profile of the upper section of the device and thus becomes too large according to railway standard.

It is further preferable, although it is not necessary to achieve the main purpose of the invention, that the periphery of the space created by the said framework body is covered with walls or sheets.

When the framework body is covered by walls, ceilings, floors of some type, such as e.g. sheets or sheet metal, the passenger cars arranged inside the device are protected against weather, wind, sparks during train transport, bird droppings, stone chips etc. That is an additional advantage during storage in comparison to storage at large outdoor car parks.

At boat transport it may also be important to avoid the tough marine environment with water and salt that risk exposing the transported passenger cars to unnecessary stress. This is especially important in order to place the device as deck cargo at e.g. container ships.

If the device comprises walls of sheet metal or sheet, it is advisable to also have at least one door, and preferably one door for each passenger car storage compartment in the device.

These doors are preferably designed so that the section of the roof that covers the current passenger car storage compartment is part of the door along with a wall section, in order to let a passenger car be unloaded either through an opened wall section, or vertically upwards through a roof section.

According to one variant of the invention is further two removable railway bogies adapted to be connected to each of the ends of the device in the longitudinal direction, so that the two said railway bogies carries the weight of the device.

This makes it possible to transport the device on railway, which cannot be done with conventional railway cars, where the vertical position of the passenger cars inside the device makes the device too high to be placed on a conventional railway car.

However, with specially designed railway bogies fitted, all of the available height according to current railway standard can be used, except for the ground clearance to the rails that is required.

In this way, the maximum height of the container can be used and as long passenger cars as possible can be transported therein.

The ability to transport the device also on railway makes the container solution complete so that it can be transported by train or boat, i.e. it covers all the main methods of passenger car transport. Of course, nothing obstacles for transporting the device in other ways, such as e.g. with an airplane.

The main variant of the invention is intended to be adapted to the maximum dimensions of the railway standard, i.e. according to maximum loading gauge dimensions according to railway standard, which can make it too large for transport by truck as a normal container. Although the device is too large according to a normal truck standard, it can nevertheless often be moved by truck if the road is not limited by viaducts and tunnels. It can for example involve shorter partial transports, e.g. from factory to port or from factory to railway. Sometimes government permission is required to move devices that go beyond the dimensions of local truck standards. It has to be noted that the device according to the invention with some modification can be adapted to the dimensions according to the truck standards. Such a modified device is likely to have a smaller height, width and length, so that the longest passenger cars available can not be transported completely vertical, but has to be tilted slightly. It is further unlikely that two passenger cars fit with the bottom toward each other and the said vertical center structure, but the compartments of the device may need to be positioned so that the bottom of the passenger car is facing forward or backward instead.

According to one variant of the invention is further two removable truck bogies adapted to be connected to each of the ends of the device in the longitudinal direction, so that the two said truck bogies carries the weight of the device. These can be adapted for connection to the device regardless of whether it has dimensions for rail or truck standard.

The substantially vertical positioning of the passenger cars may include a slope of between 0 and 5 degrees. If the passenger cars are too long for the height of the device, the slope however may be increased to 0 to 25 degrees or even up to 45 degrees if required. It the passenger car is tipped too much it might be the case that only one frame plate fits in the widths direction of the device.

The invention derives further to a method of transporting passenger cars or equivalent by means of the device as described above. The same advantages of known technique, which is obtained for the device is of course also obtained for the corresponding procedure.

The method comprising the following steps: placing a passenger car vertically in the said device, securing the passenger car with the said at least one fastening device so that the passenger car cannot move, transporting the device from one location to another, and remove the passenger car from the said device.

The passenger car is preferably attached to a ramp plate according to the description above, and then preferably lifted in place by a lifting device. If a lifting device is missing, the passenger car is positioned vertically in the said device by pulling the passenger car into place with a winch.

The passenger car can be removed from the device by lifting the passenger car with a lifting device or by rolling down the passenger car along the said frame plate.

The method comprising the following step: securing the said passenger car by means of the said at least one fastening device by clamping the chassis and/or the wheels of the passenger car with a fastening device selected from the group consisting of: straps, chains, ropes, cords, wire or other similar fastening device.

The fastening is done in such a way that the passenger car is firmly attached to the plate and withstands to be lifted in any direction by lifting the plate. It is important in all forms of transport that the cargo cannot move from the intended position during transport.

In a further embodiment of the present invention, the movable ramp plate described above is already in use during the production of the passenger car.

The passenger car is built on the plate already in the production line and can be used at the factory to turn the passenger car so that it hangs vertically or at any other angle that is suitable for the production. When the passenger car moves from one station to another within the factory; that can be done with the passenger car hanging vertically, which saves space in the passenger car factory.

BRIEF DESCRIPTION OF THE FIGURES

The purposes described above as well as additional purposes, features and advantages of the present invention can be better understood through the following illustrative but non-limiting detailed descriptions of the variants shown, by reference to the attached figures, wherein.

DETAILED DESCRIPTION OF THE PRESENTED VARIANTS OF THE INVENTION

Figure 1:
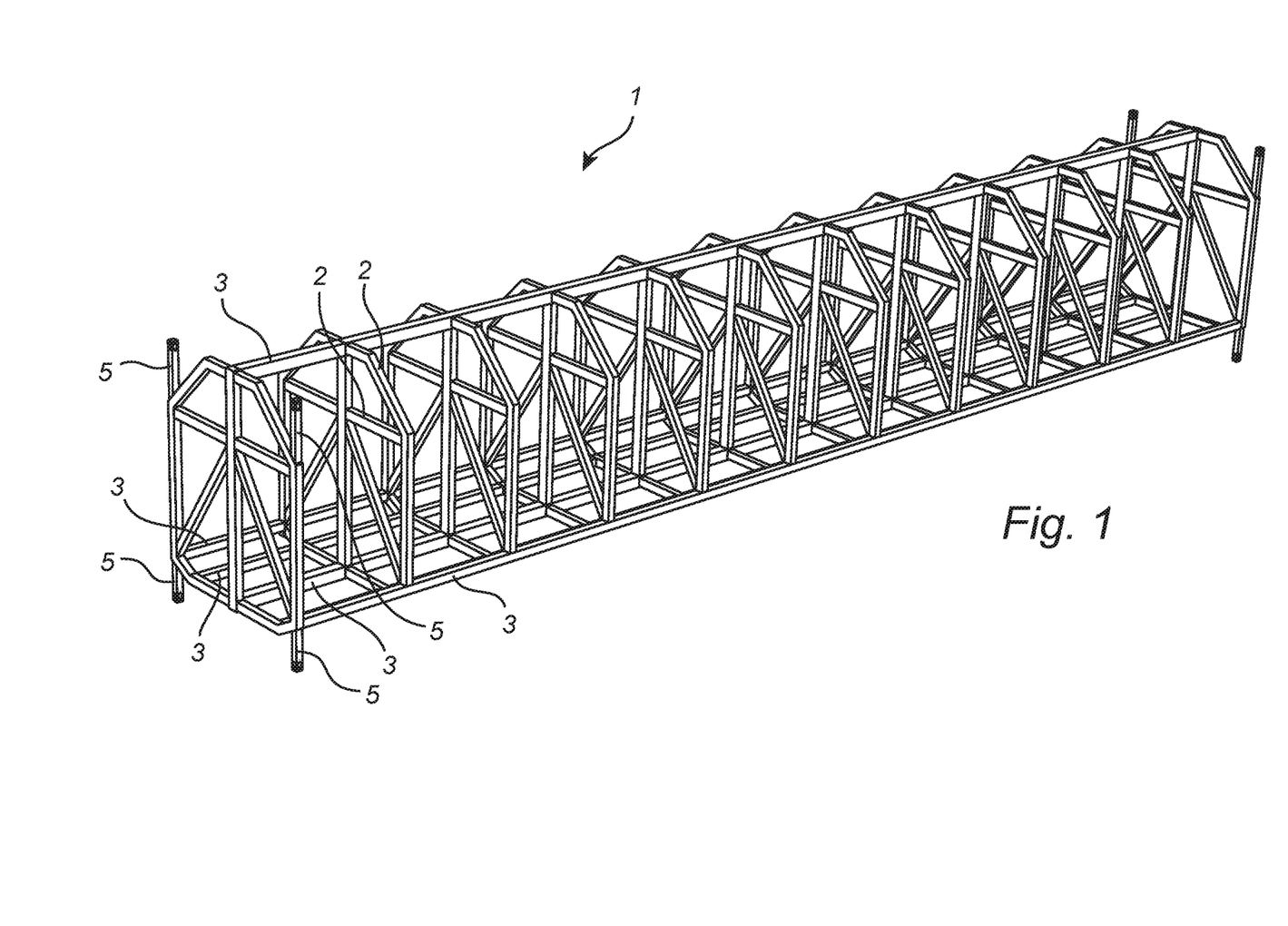
FIG. 1 shows the framework body of a device according to the current invention.

FIG. 1 shows the framework body 1 of the device for transport and storage of passenger cars according to the invention. The framework body is constructed from several two-dimensional frameworks 2, placed in the cross direction of the device, and several connecting elements 3, placed in the longitudinal direction of the device, which connects the frameworks 2. A fastening device (not shown) for attachment of passenger cars is located at a vertical center structure that runs in the longitudinal direction in the center of the device according to the width. In the four bottom corners of the framework body vertically oriented support legs 5 are positioned. They are adjustable in height and can be completely retracted into the framework body. In the four upper corners of the framework body corresponding support legs are positioned. They are also vertically oriented, adjustable in height and can be completely retracted into the framework body 1.

Figure 2:
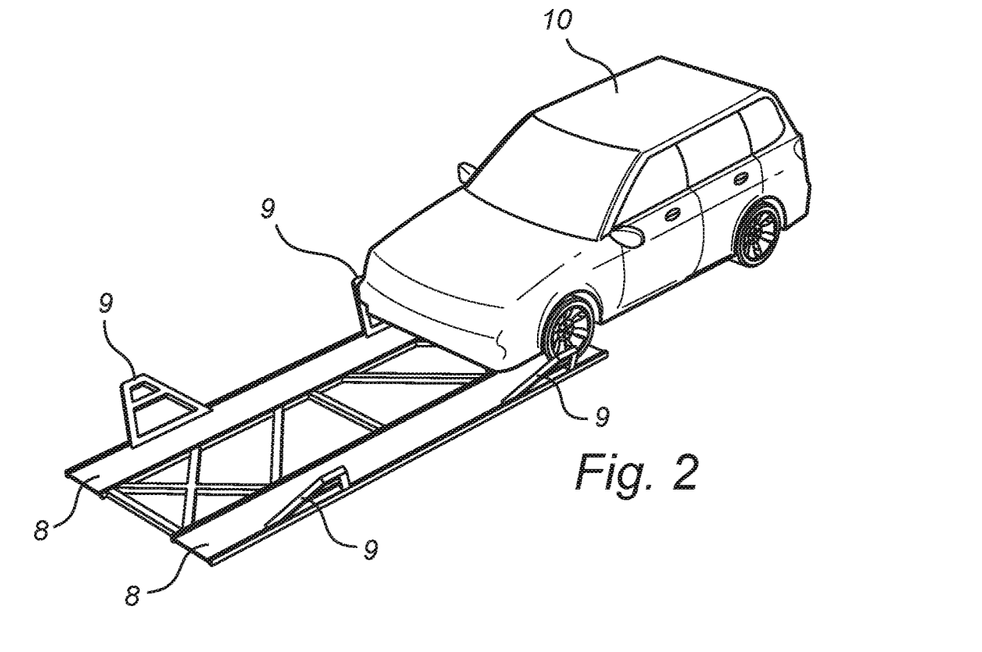
FIG. 2 shows a passenger car that is driven up on a ramp plate according to the invention.

FIG. 2 shows a movable ramp plate 7 according to the invention, lying on a flat surface so that a passenger car 10 can be driven up to its wheel ramp 8. The passenger car is then secured with fastening devices (not shown) to the ramp plate 7 by using the anchors in the body and/or wheels (not shown) of the passenger car and the attachment points of the ramp plate 9. When the passenger car is firmly secured to the ramp plate, the ramp plate and the passenger car can be lifted with a lifting crane or similar lifting device (not shown).

Figure 3:
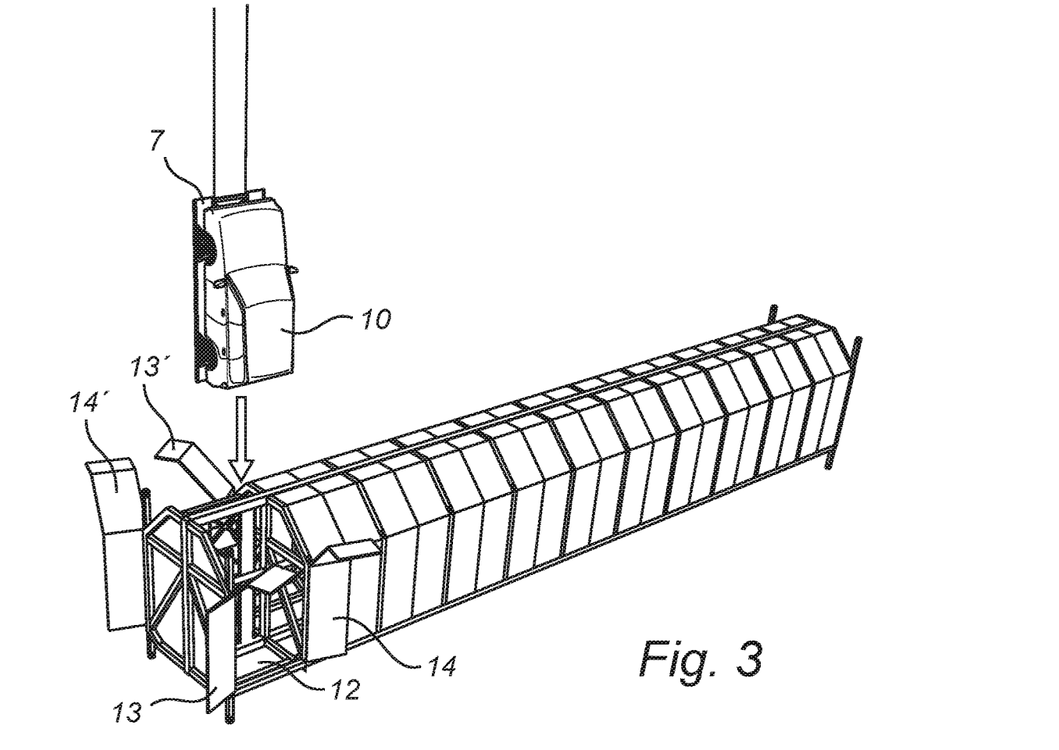
FIG. 3 shows how a passenger car that is attached to a ramp plate is lifted into place in the device according to the invention.

FIG. 3 shows the ramp plate with a passenger car about to be lifted into place in a compartment between two frameworks of the device so that it is positioned vertically in the device with the ramp plate positioned towards the vertical center structure and roof of the body facing outwards towards the long side of the device. FIG. 3 also shows doors 13, 14 of each compartment 12 of the device. Each door comprises a wall and roof section of the device so that each compartment side wall and a section of the roof opens at the same time the doors 13, 14 are opened.

Figure 4A:
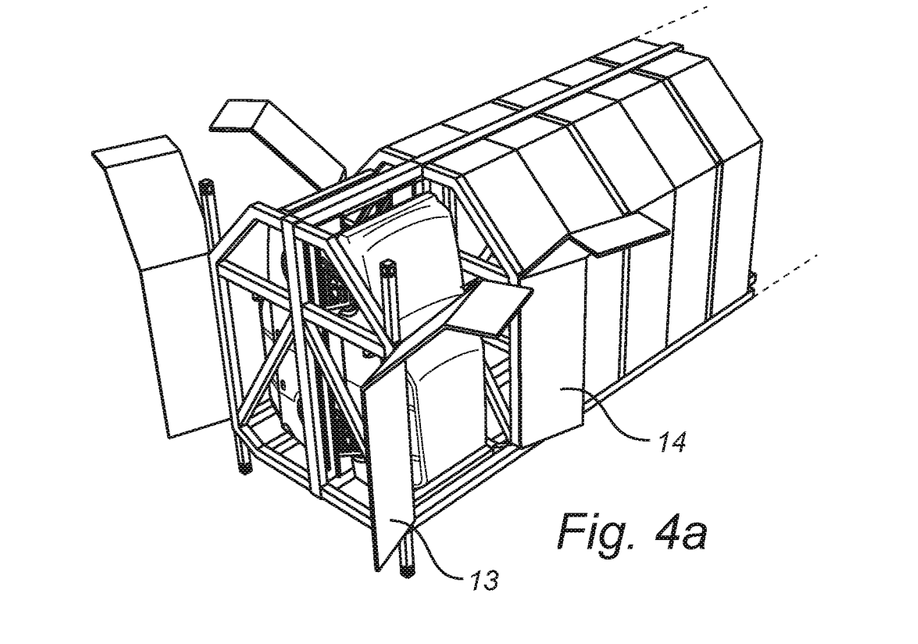
FIG. 4a shows two passenger cars placed in a compartment of the device according to the invention.
Figure 4B:
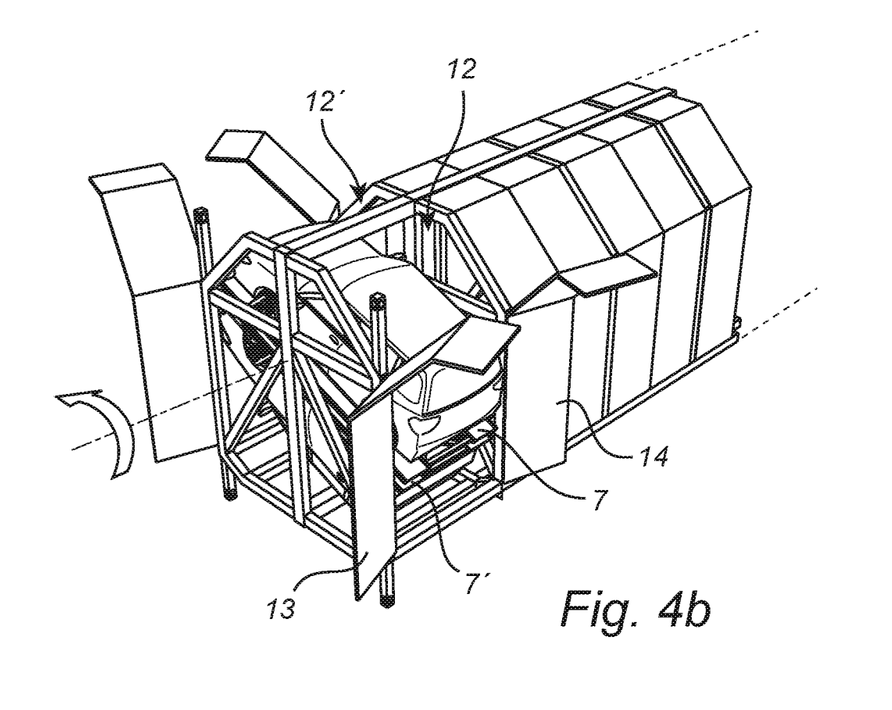
FIG. 4b shows how the ramp plates which the passenger cars are attached to, are rotated as a preparation for unloading one of the passenger cars
Figure 4C:
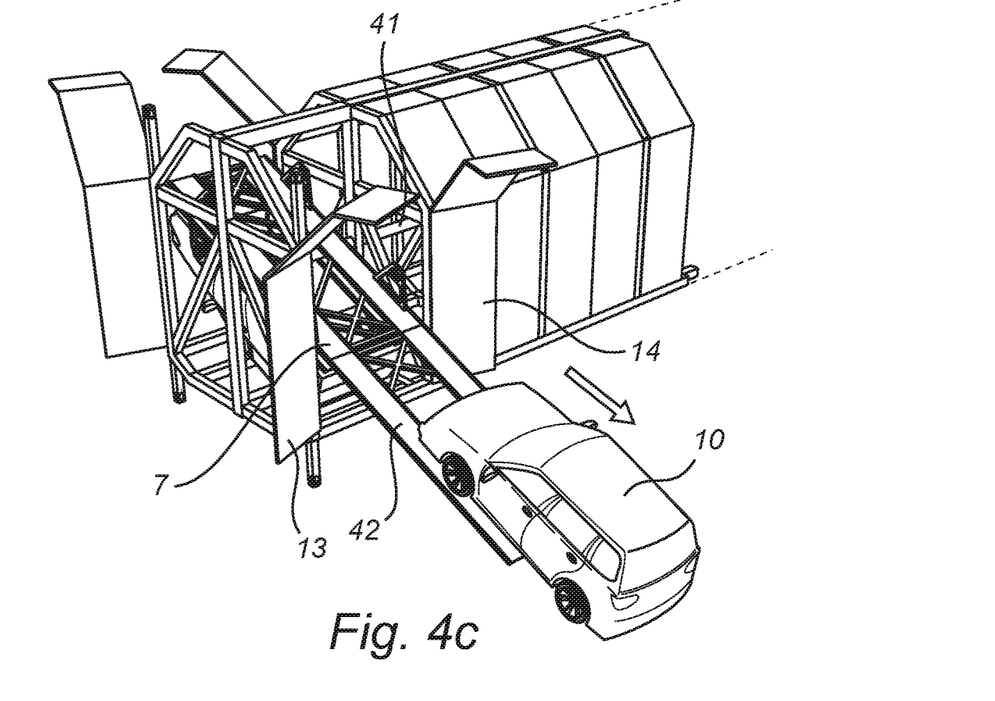
FIG. 4c shows how a passenger car is rolled out from a compartment of the device, onto an extendable ramp that runs from the ramp plate to the ground.

FIG. 4a-FIG. 4c shows a possible variant for the unloading of a passenger car 10 from one of the compartments 12. FIG. 4a shows two passenger cars which are mounted on the ramp plates 7, 7' are positioned on each side of the vertical center structure of the device during transport. The doors 13, 14 are opened as a preparation for unloading. FIG. 4b shows how the ramp plate 7, which a passenger car 10 is attached to, is rotated around the center line 41 of the vertical center structure. The ramp plate 7' and the passenger car 10' on the other side of the device is also rotated, consequently, so that they become positioned below the passenger car 10 to be unloaded.

FIG. 4c shows how a ramp 42 is extendable from the ramp plate 7 in the form of an extension of the wheel ramps of the ramp plate 7. That makes it possible to roll out a passenger car all the way down to the ground or the surface intended for the passenger car. To be able to roll out the passenger car 10 the passenger car is unloaded from the ramp plate 7. If the ramp plate 7 and the ramp are used to load a passenger car again; a winch (not shown) is provided in the device to pull up the passenger car to the ramp plate 7.

Figure 5A:
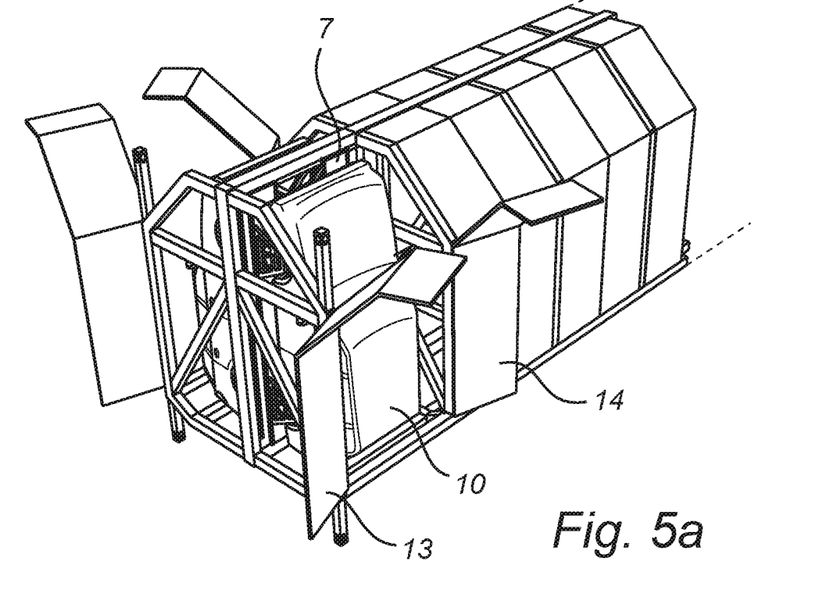
FIG. 5a-FIG. 5b show how passenger cars can be released from the device according a variant of the invention in which a ramp plate is folded out from a vertical center structure of the device.
Figure 5B:
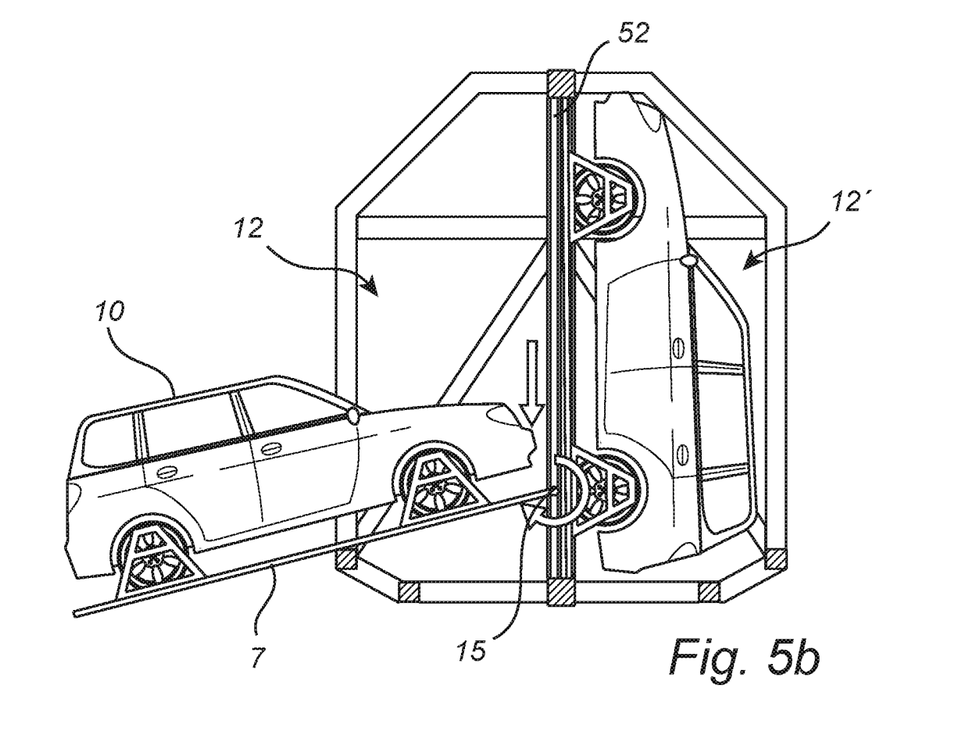

FIG. 5a-FIG. 5b shows another possible variant, for the unloading of a passenger car 10. FIG. 5a shows how two passenger cars fitted to the ramp plates 7, 7' are placed during transport on each side of the central structure of the device. In FIG. 5b the ramp plate 7 is pivoted out from the vertical center structure around a hinge 15 in the upper section of the ramp plate 7. The hinge 15 may run along a rail 52 in the vertical center structure so that the lower section of the ramp plate is in permanent contact with the ground. As an optional accessory, a ramp (not shown) can be pulled out as an extension of the wheel ramps of the ramp plate if necessary.

If the ramp plate 7 and the ramp are used to load a passenger car again; a winch is provided in the device to pull up the passenger car to the ramp plate 7.

Figures 6A, 6B:
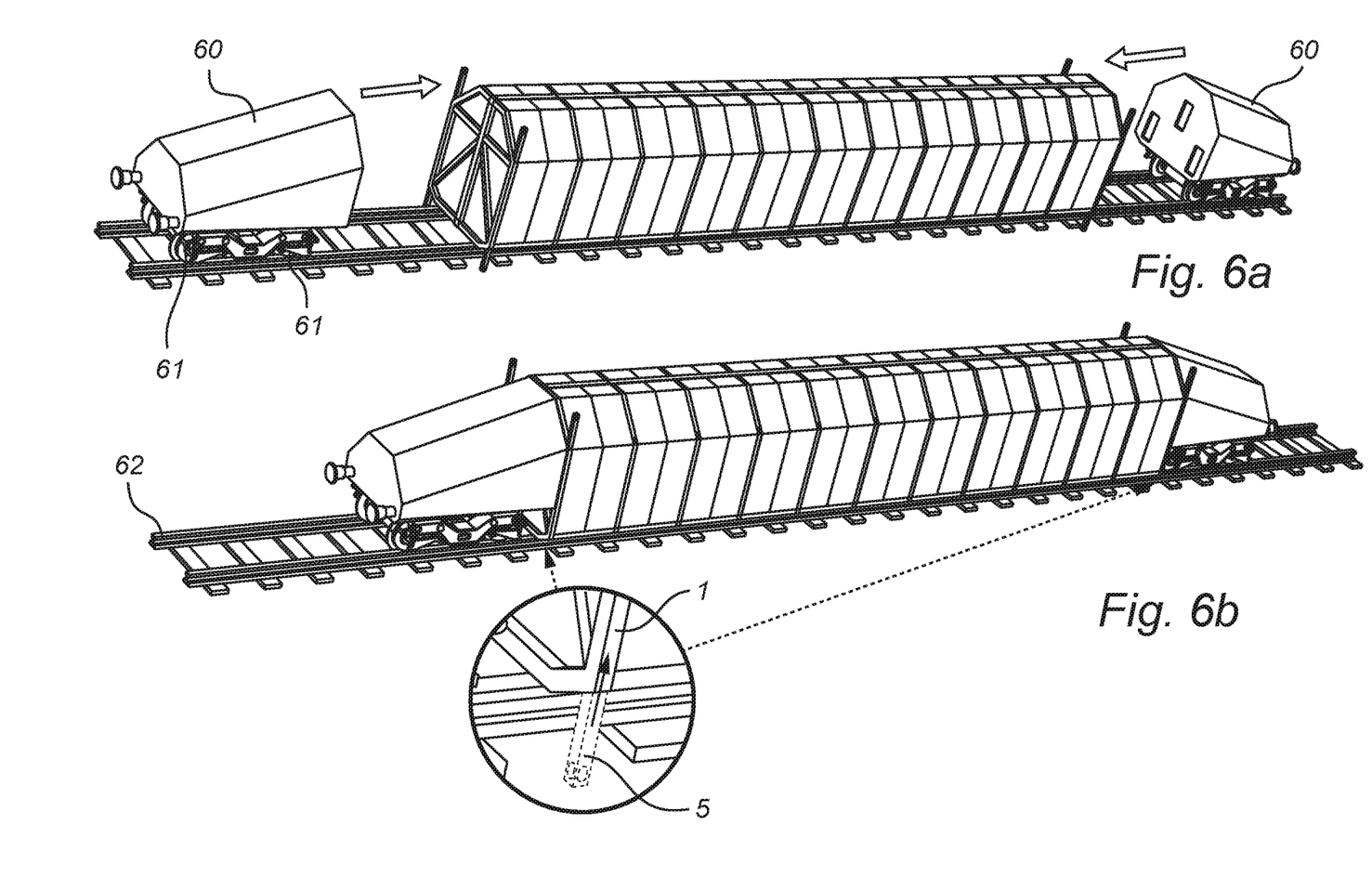
FIG. 6a-FIG. 6b show how railway bogies can be connected to the device according to the invention.

FIG. 6a-FIG. 6b shows how two railway bogies 60 can be connected to the device at its short sides. Each railway bogie 60 has four wheels adapted to fit the rail 62. Note that these railway bogies 60 also can be made with different number of wheels, e.g. 2, 6 or 8 wheels. In FIG. 6a the device rests on the lower support legs 5, which are adjusted to the correct height for the connected railway bogies. Each railway bogie moves in the direction of the arrows towards the device for connection by means of the locking devices (not shown).

In FIG. 6b, each railway bogie has been secured and the support legs 5 can be pulled up, as shown in the enlargement in FIG. 6b.

Figure 7:
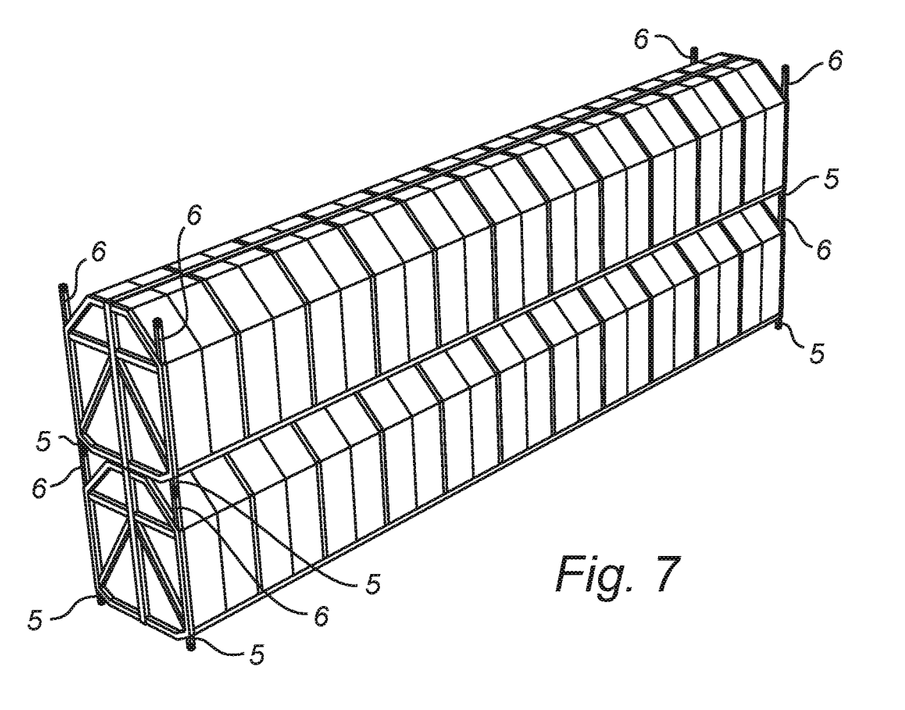
FIG. 7 shows two containers stacked upon each other according to the invention.

FIG. 7 shows how two devices according to the invention have been stacked upon each other. The upper support legs 6 of the lower device is connected to the lower support legs 5 of the upper device so that force from the upper device is absorbed by the framework body of the lower device.

The following describes how the invention is used for transporting passenger cars.

A passenger car 10 to be transported by the device for transport and storage of passenger cars or equivalent is driven up on a ramp plate 7. There the passenger car is secured so that the ramp plate 7 and the passenger car 10 are joined together as a unit.

A lifting device, e.g. a lifting crane (not shown) is then used to lift the ramp plate 7 together with the passenger car 10 in the end of the ramp plate 7 in which the passenger car has its front.

The ramp plate and the passenger car are then lifted into a compartment 12 in the device so that ramp plate is placed at the center line and the vertical center structure. There the ramp plate is secured to the vertical center structure so that the ramp plate is fixed in all directions. Then the doors 13, 14 to compartment are closed so that the passenger car 10 is protected from weather and wind.

If temporary storage is required, move the device to a surface for storage in which several of the devices are stacked upon each other in order to take up less space. The transport to the temporary storage area is performed by means of e.g. lifting crane, overhead crane, train or truck.

From the temporary storage area the device is moved to the transport mode chosen. If boat is chosen the device is lifted onto the boat by means of lifting crane or similar lifting devices. When the boat has reached its destination port the devices are lifted out and the passenger cars are lifted out by means of a lifting crane unless the devices are not to be transported further to other transport mode such as trains or trucks. If the passenger cars are to be temporarily stored in the port they are stacked upon each other in a suitable place in order to take as little space in the harbour area as possible.

If the transport mode is truck and the device has dimensions suitable for truck transport each device is lifted onto a truck flatbed and it is driven to its destination. When the device is placed on a truck flatbed the support legs 5, 6 are retracted completely so that they do not increase the height of the device upwards or downwards.

If the mode of transport is train, which is preferable from an environmental point of view and from a space point of view due to the generous dimensions are allowed in railway standards, special made railway bogies are used. These are connected to the device according to the description above. The connection of the railway bogies requires that the lower support legs 5 are adjusted to the correct height; so that the couplings of the railway bogies are placed in the correct height for the corresponding couplings of the device. After that the railway bogies and the device is connected together as one unit. The device can then be pulled on a railway track in a normal cargo train. Each railway bogie comprises, which any professional in the area realises, brakes (not shown) controlled by the locomotive which pulls the train set, and suitable couplings for connection to other train cars (not shown).

When the device reaches its final destination, the passenger cars are going to be unloaded from the device. First the doors 13, 14 are opened. After that the passenger cars can either be lifted vertically upwards through the open doors with a lifting crane, if available, or they can be rolled out from the compartments of the device. If the passenger cars are rolled out the mechanism for this, available in the device, is used. If the device variant is the one with a rotatable ramp plate around the center line of the vertical center structure: the ramp plate is rotated, a ramp is pulled out so that it reaches the ground and the passenger car is slowly rolled out. The winch in the device can be used to hold the passenger car back when it is rolled down the ramp. If the device variant is one with a pivotal ramp plate, this is pivoted out and the passenger car is rolled down with the winch holding the passenger car back when it is rolled down.

When loading passenger cars when a lifting device is not available, both variants of the said ramp plate above can be used to load passenger cars. The winch is used to pull up the passenger car with the wheels of the passenger car rolling in the designated wheel ramps. When the passenger car is pulled up entirely, the passenger car is secured in the ramp plate, which is rotated or pivoted to its vertical position and secured in this position. After that the passenger car and the device are prepared for further transport.

In one variant, there is a lifting device to lift passenger cars in and out of the compartments of the device; mounted on the device itself. The lifting device may for example be a crane arm that can be placed in an additional compartment that covers the short side or in a compartment in the middle of the device, in order to minimize its length required. The crane arm may for example be of a similar type that is often found on trucks between the cab and the flatbed. The lifting device may however of course be positioned in other ways than the two examples described above.

The ramp plate 7 according to the invention is preferably used already at the factory where the passenger car 10 is manufactured. As soon as it is suitable in the production line; the passenger car can be attached to the ramp plate 7. The further transport of the passenger car in the factory is then preferably performed by moving the ramp plate. The passenger car can then be easily rotated to the desired angle that is beneficial for the current assembly operation. If the passenger car at some point along the production line needs to wait for the next operation, the passenger car is preferably hung vertically in the ramp plate 7, so that the passenger car takes as little space as possible of the length of the production line. When the passenger car reaches the end of the production line and thereby is completely assembled, the passenger car is lifted into a free compartment of the device, according to the invention, in order to start its transport to the end customer.

To be noted is that the invention is not limited to the specific variants described above, but is to be broadly interpreted according to the appended claims. The professional realizes, for example, that the current invention may be used for transport of equipment other than passenger cars which are normally transported horizontally. The professional realizes further that the compartments 12 of the described variants may be located in other ways, and that ramps, fastening devices, winches and lifting devices may be mounted in various ways in the device, without going beyond the scope of the invention.

It is also to be noted that the device, according to the invention, preferably may be used for all types of passenger car transports, i.e. not only to transports from the factory to the end customers, but also the transport of used passenger cars. For the transport of new passenger cars the device is preferably used in both directions, e.g. for both import and export of passenger cars from e.g. a port. If there is no need for passenger car transport in one direction along a transport path, the device can suitably be used for transport of normal pallets or other normal cargo.

The invention claimed is:

1. A device for transport and storage of passenger cars comprising:
   at least one two-dimensional framework,
   at least one connecting element positioned and attached in the third dimension perpendicular to said at least one two-dimensional framework,
   wherein said two-dimensional framework and said connecting element together form a framework body of said device,
   wherein:
   the device further comprises at least one fastening device for vertical attachment and storage of a passenger car so that the passenger car is arranged vertically,
   wherein said framework body comprises a vertical center structure along the center line of the device,
   wherein said at least one fastening device is arranged towards said vertical center structure so that a passenger car is arranged in vertical direction with the bottom plate of the passenger car facing said vertical center structure and the front end of the passenger car facing upwards, and
   wherein the cross-sectional shape of said framework body in the lateral direction of the device is limited to established maximum cross-sectional dimensions according to railway standard;
   wherein the length of said device in said longitudinal direction is larger than the width of the device in said lateral direction, and
   wherein said vertical center structure is pivotal around its horizontal center line.

2. The device according to claim 1, wherein said at least one two-dimensional framework is arranged substantially vertical in the lateral direction of the device, and said connecting element is extending in the longitudinal direction.

3. The device according to claim 1, wherein the shape of said two-dimensional framework has an upper section that is substantially arched following railway standard.

4. The device according to claim 1, wherein said fastening device comprising a removable ramp plate adapted to drive up a passenger car eels on, whereby said ramp plate comprises attachment points intended to secure the ramp plate to the passenger car.

5. The device according to claim 4, wherein said ramp plate can be extended along said pivotal vertical center structure.

6. The device according to claim 4, wherein said ramp plate is pivotal around a joint or hinge in the upper edge of the ramp plate, seen in a vertical hanging position, whereby the hinge mentioned can be lowered so the opposite end of the ramp plate has contact with the ground.

7. The device according to claim 1, further comprising bottom support intended to carry the device and its content.

8. The device according to claim 5, wherein a plurality of bottom supports is extendable vertically from the said framework body and is adjustable in its vertical direction.

9. The device according to claim 1, wherein the device comprises support upwards, adapted to carry another container or weight.

10. The device according to claim 1, wherein the periphery of the space created by said framework body is covered with walls or sheets.

11. The device according to claim 9, wherein said device comprises one door for each passenger car.

12. The device according to claim 1, wherein the device further comprises a winch dedicated to pull up the passenger car on said ramp plate.

13. The device according to claim 1, wherein the substantially vertical positioning allows a slope of between 0 and 45 degrees.

14. A method of transporting a passenger car in a device according to claim 1, the method comprising the steps of:
   positioning the passenger car vertically in said device, securing said passenger car with said fastening device so that the passenger car cannot move, transporting said device from one location to another, and removing said passenger car from said device.

15. The method according to claim 14, wherein the step of positioning the a-passenger car vertically in said device is preceded by a step to secure the passenger car in a ramp plate.

16. The method according to claim 14, wherein the said step of positioning a passenger car vertically in said device is achieved by pulling the passenger car with a winch.

17. The method according to claim 14, wherein the step of securing said passenger car with said fastening device comprises clamping the chassis and/or the wheels of the passenger car with an attachment device selected from the group consisting of: straps, chains, ropes, cords or wire.

* * * * *